(No Model.) 2 Sheets—Sheet 1.
W. FRITSCHE.
ARMATURE FOR ELECTRIC MACHINES.
No. 515,467. Patented Feb. 27, 1894.
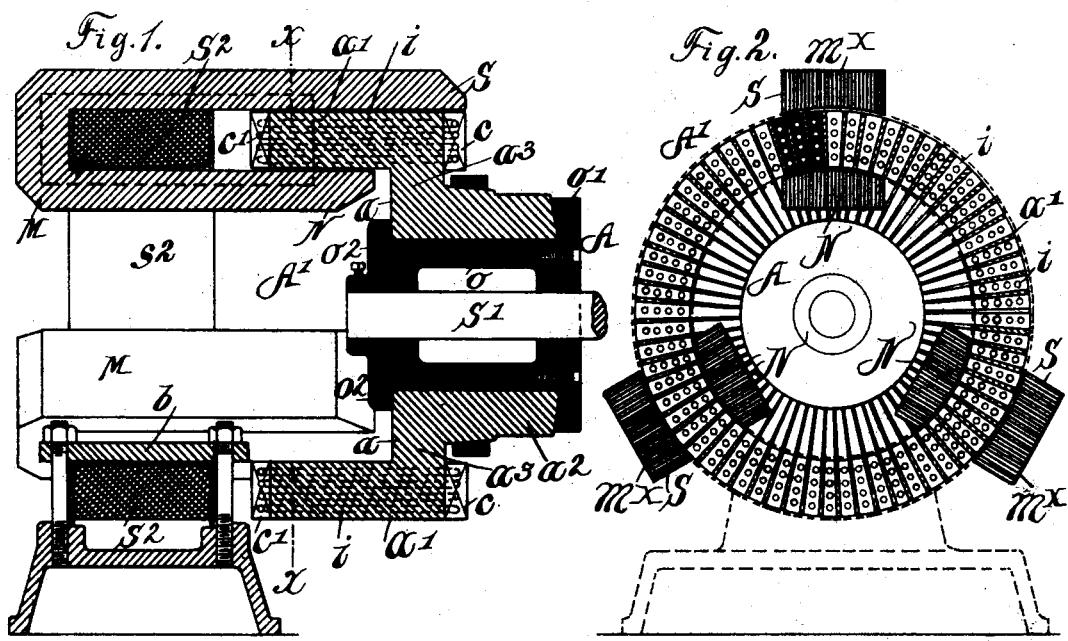
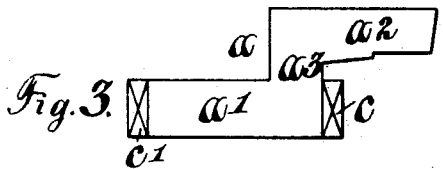
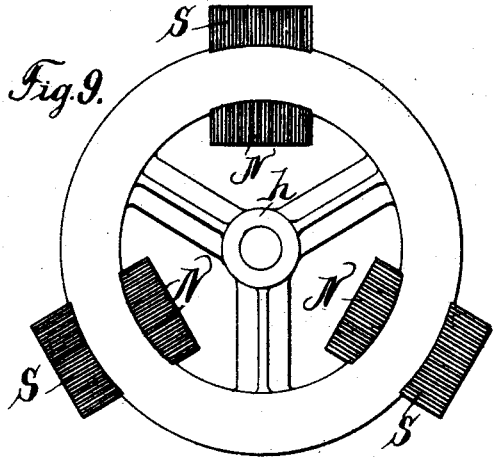
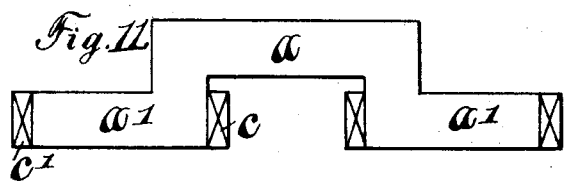
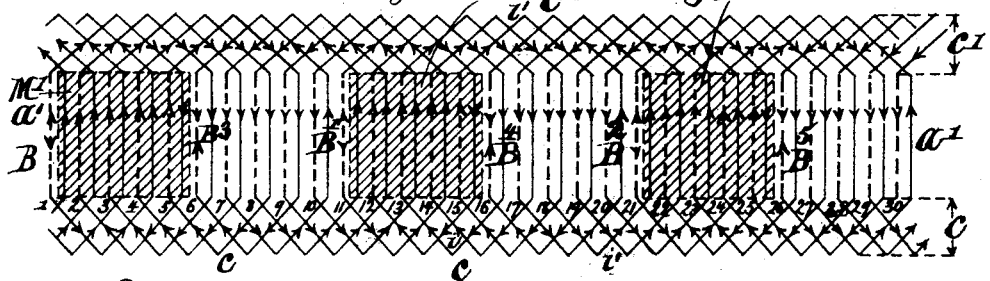
Witnesses:
H. G. Dieterich
Henry Orth
Inventor:
Waldemar Fritsche (No Model.) 2 Sheets—Sheet 2.
W. FRITSCHE.
ARMATURE FOR ELECTRIC MACHINES.
No. 515,467. Patented Feb. 27, 1894.
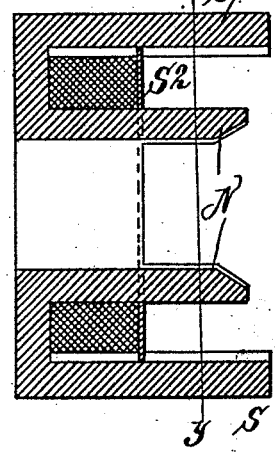
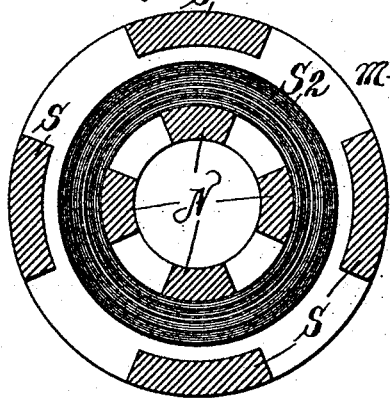
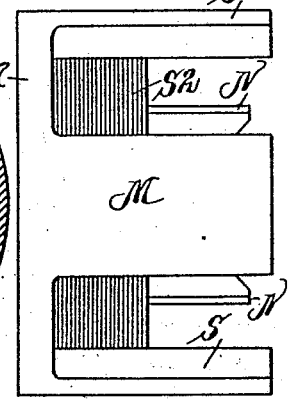
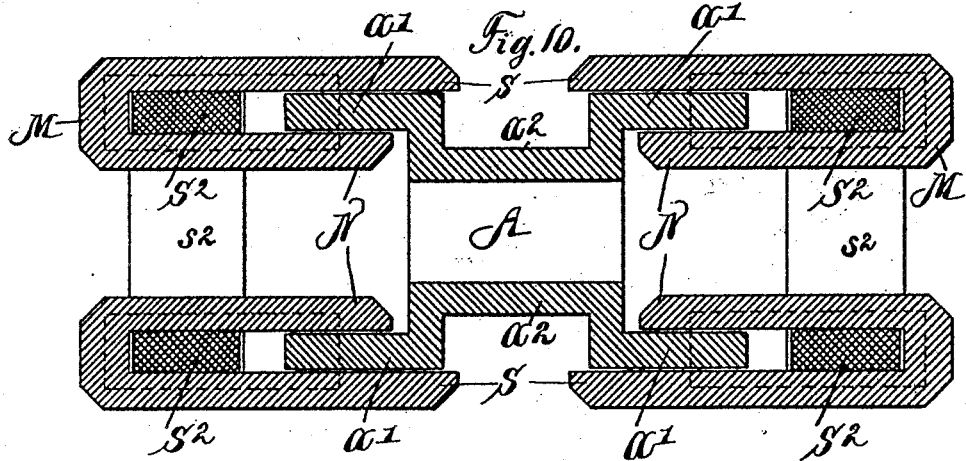
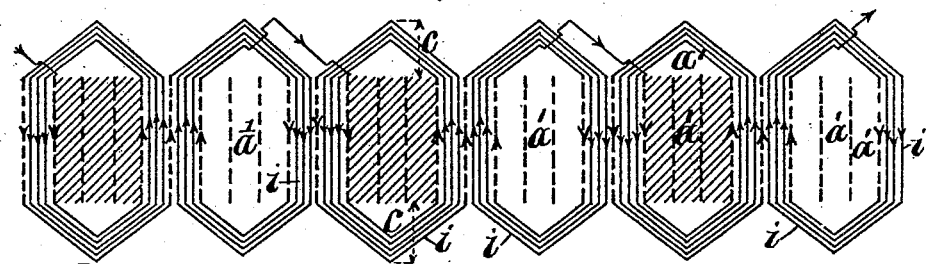
Witnesses:
H. G. Wieterich
Henry Orth
Inventor:
Waldemar Fritsche,
By Henry Orth, atty

UNITED STATES PATENT OFFICE.

WALDEMAR FRITSCHE, OF BERLIN, GERMANY.

ARMATURE FOR ELECTRIC MACHINES.

SPECIFICATION forming part of Letters Patent No. 515,467, dated February 27, 1894.

Application filed July 1, 1893. Serial No. 479,350. (No model.)

*To all whom it may concern:*

Be it known that I, WALDEMAR FRITSCHE, a subject of the German Emperor, residing at No. 4 Am Kupfergraben, Berlin, Germany, have invented certain new and useful Improvements in Armatures for Electric Machines; and I do hereby declare the following to be a clear and exact description of the invention.

My invention has relation to dynamo electric generators or electro-dynamic motors or current converters, and it consists essentially in the construction of the armature and field magnet or magnets, and their relative arrangement, as will now be fully described, reference being had to the accompanying drawings, in which—

Figure 1 is a longitudinal axial sectional view of a machine of the class referred to embodying my invention. Fig. 2 is a transverse sectional view on or about on the line $x$—$x$ of Fig. 1. Fig. 3 is an elevation of one of the armature elements. Fig. 4 is a diagrammatic view of the armature developed. Fig. 5 is a like view of the armature for an alternate current machine. Fig. 6 is a longitudinal central section; Fig. 7 a cross section on or about on line $y$—$y$ of Fig. 6, and Fig. 8 a side elevation of a modification in the construction of the field magnets shown in Fig. 1. Fig. 9 is a face view of a revoluble field magnet. Fig. 10 is a longitudinal central section of a construction of twin armatures and field magnets; and Fig. 11 is an elevation of one of the elements thereof.

Similar symbols indicate like parts wherever such may occur in the above figures of drawings.

My improved armature is adapted for use for dynamo electric generators or in electro-dynamic motors or for current converters, and its construction differs from those heretofore in use in that the armature is a built up one with its core divided on planes perpendicular to its plane or direction of rotation or motion, whereby spaces are obtained between the armature elements for the reception of the windings or conductors, and whereby said elements may constitute a part of the winding and serve as current inductors or eductors or both. To this end the magnetic field is so arranged that the direction of the flow of the current *i. e.*, the power lines, will likewise be perpendicular to the said direction of motion of the armature. It is therefore necessary that the armature core should be so arranged between the N. and S. poles of the field magnets that like poles shall always be on one side and diametrically opposite unlike poles on the opposite side of said core. By means of this arrangement I am enabled to materially simplify the construction of the armature and to so close the magnetic circuit to greatly reduce or minimize the intervening atmospheric resistance, that is to say the resistance of the atmospheric air between the armature and field magnets.

Referring now to Figs. 1 to 4, it will be seen that the armature core is made up of a series of lamellæ or blades $a$ hereinafter called elements, of a conducting material, as iron, having substantially the form of a letter Z, the arms $a^2$ thereof being assembled on a hub $o$ of insulated material or otherwise insulated from said hub or from the shaft $S'$ to which the hub is secured. The rear edge of the arms $a^2$ of the elements is inclined vertically and abuts against a correspondingly inclined bearing face of a ring or washer $o'$, likewise of an insulating material or insulated from the elements or from the shaft $S'$ as may be desired or found most convenient. The forward end of said arms, or more properly the vertical face of the web $a^3$ that connects the lower limb or arm $a^2$ with the upper limb or arm $a'$ abuts against an annular flange $o^2$ of the hub $o$, as clearly shown in Fig. 1. The relative arrangement of the elements $a$ is such as to form a space between each two of them, the outer portion of said space, that is to say the space between the limbs $a'$, serves for the reception of the windings or conductor wires $i$ arranged parallel with one another and with the said limbs $a'$, as well as with the shaft $S'$, and said conductors are insulated from one another as well as from the elements as shown in solid black in Fig. 2, a polygonal space being left at each end of said space, as indicated at $c$, $c'$, Figs. 1 and 3 for the connection between the conductors $i$ and the elements $a$. The armature when constructed as described is a hollow cylinder of variable diameter or substantially of a bell shape, and the cylindrical or substantially cylindrical portion A' formed by the limbs $a'$ and the winding $i$, lies between the N. and S. poles of the field magnets M, of which I have shown three in the drawings, as an example, the current phase, that is to say the lines of force being indicated by dotted lines in Fig. 1.

In Fig. 4 I have shown in projection an armature for a tri-polar continuous current machine embodying my invention, the element limbs $a'$ being indicated by heavy dotted lines, the elements themselves being numbered from 1 to 30, the conductors $i$ indicated by full light lines, their connections in spaces $c, c'$ also by full light lines, and the symbol $i'$, and the magnetic fields by section lined polygons and the symbols $M', M^2, M^3$ respectively. Inasmuch as poles of like name as for instance N. poles are, as shown in Figs. 1 and 2, arranged about the inner periphery of the armature A, hence, poles of like name, as for instance S. poles will be arranged diametrically opposite said N. poles about the outer periphery of said armature, so that the lines or direction of force in the armature will be in radial planes.

The device, as a brush, for supplying current to or taking current off the armature will be arranged at the points B, B', $B^2$, and $B^3$, $B^4$, $B^5$, indicated also by double arrow heads. Current flows to the armature through elements 1, 11, and 21, and from said armature through elements 6, 16, and 26, while the current phases or the flow of current through the armature as indicated by arrow heads on the elements and conductors, is obvious, and can clearly be determined by an examination of Fig. 4. The conductors may be soldered or otherwise secured to the armature elements $a$, and are insulated from one another and from said elements except at the points of connection.

In Fig. 5 I have shown in projection an armature for alternating current machines, a portion only of the elements $a$ being utilized as conductors, and from these two examples, armatures composed of a greater or less number of elements or for machines having a greater or less number of poles or for multiphase current machines may readily be constructed by any one skilled in the art.

The field magnets employed in conjunction with the armature described are substantially of horse-shoe shape and are preferably or may also be built up magnets, each composed of a plurality of lamellæ $m^x$, as shown in Figs. 1 and 2, said magnets being supported and energized by a discoidal or ring spool or bobbin $S^2$ arranged in a circular case or housing $s^2$ that carries the magnets M. If a solid magnet core is desired or required the three horse-shoe magnets may form an integral part of a core $m$, as shown in Figs. 6 to 8, the limbs or pole arms, N, S, projecting from a circular or discoidal core $m$, the magnet having the form of two concentric longitudinally slotted cylinders. If the field magnets are to be stationary, the spool or bobbin case or housing is secured to the main frame in any desired manner, for instance, as shown in Fig. 1, by means of a retaining or clamping plate or bar $b$, or a plurality of such, bolted to the machine frame. If the field magnets are revoluble, the spool housing or case $s^2$ is provided with a suitable hub $h$ as shown in Fig. 9. On the other hand, both field magnets and armature may be duplicated, as shown in Fig. 10, in which case the elements of which the armature is composed take the form shown in Fig. 11.

It will readily be seen from the description of my invention that the construction of the armature is very materially simplified, and the cost thereof correspondingly reduced, and this is also the case as regards the field magnets, while the machine is very compact and occupies a comparatively small space.

I have hereinbefore described the elements of which the armature core is composed as having a substantially Z-shaped form, or a double Z-shaped form, Fig. 11, for a twin armature core, whereby a cylinder of variable diameter is obtained when said elements are assembled on a hub. I have also described the conductors $i$ as arranged between the limbs or arms $a'$ of said elements, that is to say, in the spaces of that portion of the cylindrical armature which has the greatest diameter. It is obvious, however, that these conductors may be arranged to extend the full length of the armature, and although I prefer the angular form of elements described, because a ready means is thereby provided for more conveniently connecting the same with the shaft S' through the medium of a hub, and also because the diameter of the armature beyond the field magnet poles as well as the thickness of the cylinder walls are materially reduced, I would have it understood that I do not limit myself to this construction, as it is clear that the elements $a$ may be made of a uniform width so as to form a hollow cylinder of uniform diameter, and assembled upon a wheel-like support for securing the armature to its shaft S' without departing from the spirit of my invention.

Having thus described my invention, what I claim as new therein, and desire to secure by Letters Patent, is—

1. An armature for machines of the class described, comprising a hub, a core built up of a series of interspaced angular elements arranged radially on said hub whereby a cylinder of variable diameter is formed, and insulated conductors connected with one another and with some or all of the elements, said conductors interposed between the elements of that portion of the cylinder of greatest diameter in planes substantially parallel with the longitudinal axis of said cylinder, for the purpose set forth.

2. An armature for machines of the class described, comprising a hub, a core built up of a series of interspaced elements arranged radially on said hub, and conductors contained in the spaces between the elements and arranged parallel with the longitudinal axis of the core, for the purpose set forth.

3. An armature for machines of the class described, comprising a substantially cylindrical longitudinally divided core, and conductors arranged in the core divisions in planes substantially parallel with the longitudinal axis of said core, said conductors connected with one another and with some or all of the core sections, in combination with a plurality of field magnets whose poles of like name are respectively arranged proximate to the inner and outer peripheries of the armature.

4. In a machine of the class described, the combination of field magnets of substantially a horse shoe shape, and a discoidal spool or bobbin arranged between the limbs of said magnets, the latter having like poles in the same circular plane, with a tubular longitudinally divided armature core extending between the legs of the field magnets whereby like field magnet poles will lie proximate to the inner and outer peripheries of said core, and conductors arranged in the divisions of the core in planes parallel with the longitudinal axis of said core, for the purpose set forth.

In witness whereof I have hereto signed my name in the presence of two witnesses.

WALDEMAR FRITSCHE.

Witnesses:
RICHARD SCHMIDT,
PAUL LOUBIER.